United States Patent
Gipson et al.

(10) Patent No.: US 7,291,370 B2
(45) Date of Patent: Nov. 6, 2007

(54) PACKAGING MATERIAL AND CONTAINERS FORMED THEREFROM

(75) Inventors: Kyle G. Gipson, Simpsonville, SC (US); Thomas E. Godfrey, Moore, SC (US); Lila T. Villarreal, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 553 days.

(21) Appl. No.: 10/267,606

(22) Filed: Oct. 9, 2002

(65) Prior Publication Data

US 2003/0031388 A1 Feb. 13, 2003

Related U.S. Application Data

(63) Continuation-in-part of application No. 10/178,417, filed on Jun. 24, 2002, now abandoned.

(60) Provisional application No. 60/310,771, filed on Aug. 8, 2001.

(51) Int. Cl.
*B29D 22/00* (2006.01)
*D29D 23/00* (2006.01)
*B32B 1/08* (2006.01)

(52) U.S. Cl. .................... 428/36.1; 428/35.7; 428/175; 442/59; 442/103; 442/108; 383/109; 383/113; 383/114; 383/116

(58) Field of Classification Search .............. 428/36.1, 428/36.2, 175, 35.7; 442/59, 60, 97, 101, 442/108, 103; 383/117, 109, 106, 113, 114, 383/116; 220/905
See application file for complete search history.

(56) References Cited

U.S. PATENT DOCUMENTS

| 2,116,984 | A | * | 5/1938 | Seddon .................... 442/103 |
| 3,645,822 | A | * | 2/1972 | Widiger et al. ............ 156/243 |
| 3,852,090 | A | | 12/1974 | Leonard et al. .............. 117/14 |

(Continued)

FOREIGN PATENT DOCUMENTS

GB 2 041 878 * 9/1980

(Continued)

OTHER PUBLICATIONS

Coating of Technical Textiles, Handbook of Technical Textiles, 2000.*

Primary Examiner—Michael C. Miggins
(74) Attorney, Agent, or Firm—Terry T. Moyer; Robert M. Lanning

(57) ABSTRACT

The flexible, reusable packaging container of the present invention is comprised of a packaging material. The packaging material is comprised of one or more layers of coating disposed on one or more layers of textile substrate. The coating layer may be comprised of a stiffening agent for providing support to the packaging container. The stiffening agent may provide a gas and/or liquid impermeable barrier between the contents of the container and the textile substrate. The stiffening agent may also include chemicals which impart antifungal or antibacterial properties to container. The textile substrate typically provides an aesthetically pleasing feel and appearance to the outside of the packaging container, as well as providing functional attributes such as water repellence, stain resistance, and/or anti-static resistance. The resulting packaging container possesses increased strength, puncture resistance, and resistance to de-lamination over the current paper or plastic packaging containers.

43 Claims, 8 Drawing Sheets

U.S. PATENT DOCUMENTS

| | | | |
|---|---|---|---|
| 4,109,543 A | 8/1978 | Foti | |
| 4,149,921 A | 4/1979 | Stannard | 156/246 |
| 4,207,937 A * | 6/1980 | Sandeman et al. | 383/17 |
| 4,322,464 A * | 3/1982 | Beckley | 428/175 |
| 4,442,162 A * | 4/1984 | Kuester | 442/46 |
| 4,509,197 A * | 4/1985 | Long | 383/106 |
| 4,560,610 A * | 12/1985 | Long | 442/71 |
| 4,593,408 A | 6/1986 | Drobish et al. | 383/43 |
| 4,685,546 A | 8/1987 | Sadow | |
| 4,691,372 A | 9/1987 | Van Erden | 383/63 |
| 4,696,050 A * | 9/1987 | Sengewald | 383/10 |
| 4,795,665 A * | 1/1989 | Lancaster et al. | 428/34.2 |
| 4,954,124 A | 9/1990 | Erickson et al. | 493/195 |
| 5,124,195 A | 6/1992 | Harpell et al. | 428/245 |
| 5,174,658 A | 12/1992 | Cook et al. | 383/33 |
| 5,187,005 A | 2/1993 | Stahle et al. | |
| 5,246,750 A * | 9/1993 | Dinklage et al. | 428/34.8 |
| 5,411,203 A | 5/1995 | Bochet et al. | 229/104 |
| 5,431,970 A | 7/1995 | Broun et al. | |
| 5,613,779 A | 3/1997 | Niwa | 383/201 |
| 5,759,649 A * | 6/1998 | Dinter et al. | 428/35.3 |
| 5,893,461 A * | 4/1999 | Walters | 206/524.8 |
| 5,899,783 A | 5/1999 | Kimbrell, Jr. et al. | 442/62 |
| 5,902,753 A | 5/1999 | DeMott et al. | 442/79 |
| 5,972,396 A | 10/1999 | Jurgovan et al. | 426/106 |
| 6,004,891 A | 12/1999 | Tuppin et al. | |
| 6,073,772 A | 6/2000 | Forbes et al. | |
| 6,136,730 A | 10/2000 | Kimbrell, Jr. et al. | 442/62 |
| 6,455,449 B1 * | 9/2002 | Veiga et al. | 442/218 |
| 6,675,734 B2 | 1/2004 | Eagles et al. | |
| 2002/0106955 A1 | 8/2002 | Underwood et al. | |
| 2002/0122926 A1 | 9/2002 | Goodson | 428/220 |
| 2002/0153216 A1 | 10/2002 | Krulik | |

FOREIGN PATENT DOCUMENTS

| | | |
|---|---|---|
| JP | 02-072079 | 3/1990 |
| JP | 08-142270 | 6/1996 |
| JP | 11-165788 | 6/1999 |

* cited by examiner

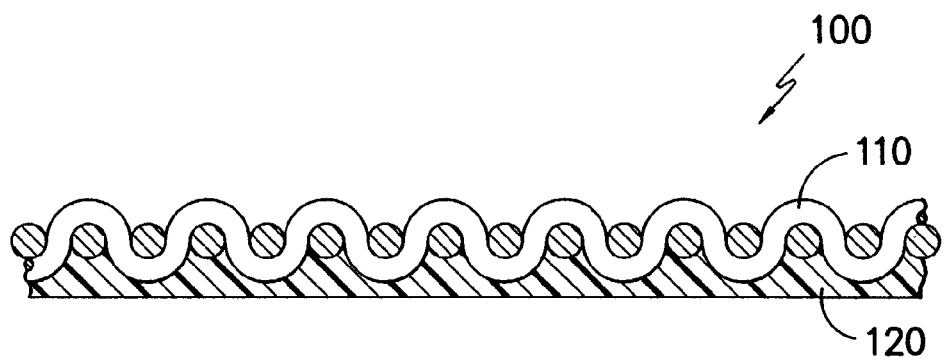
FIG. -1-
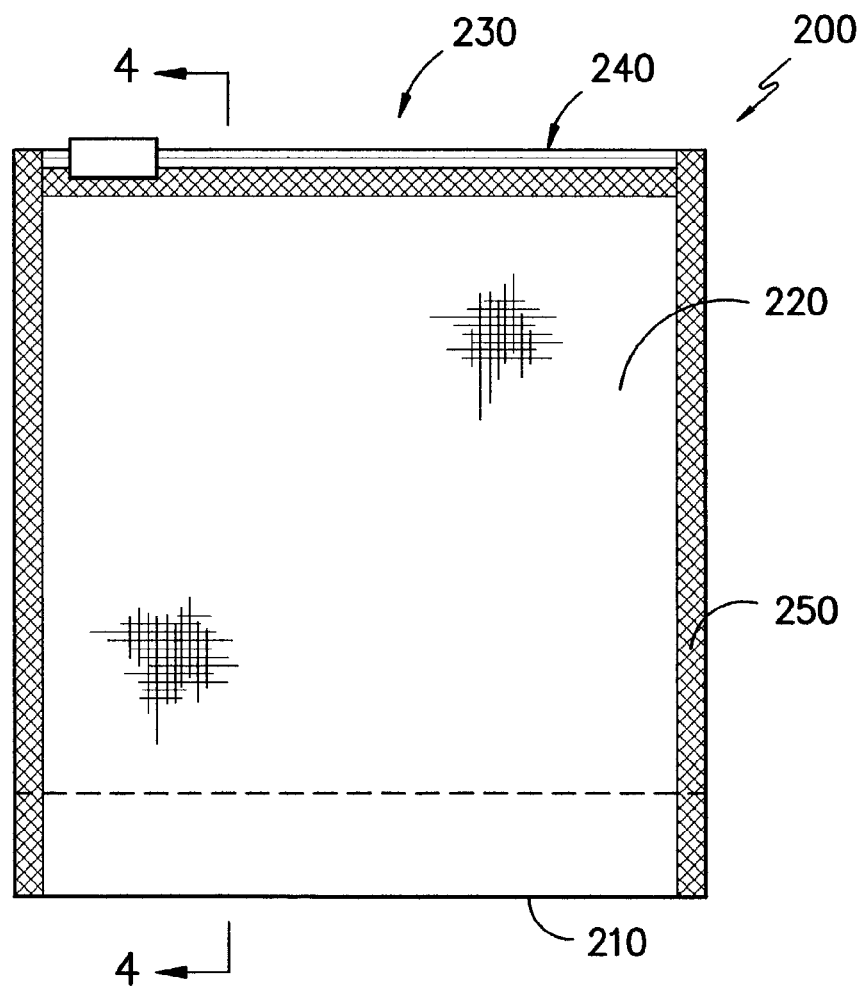
FIG. -2-

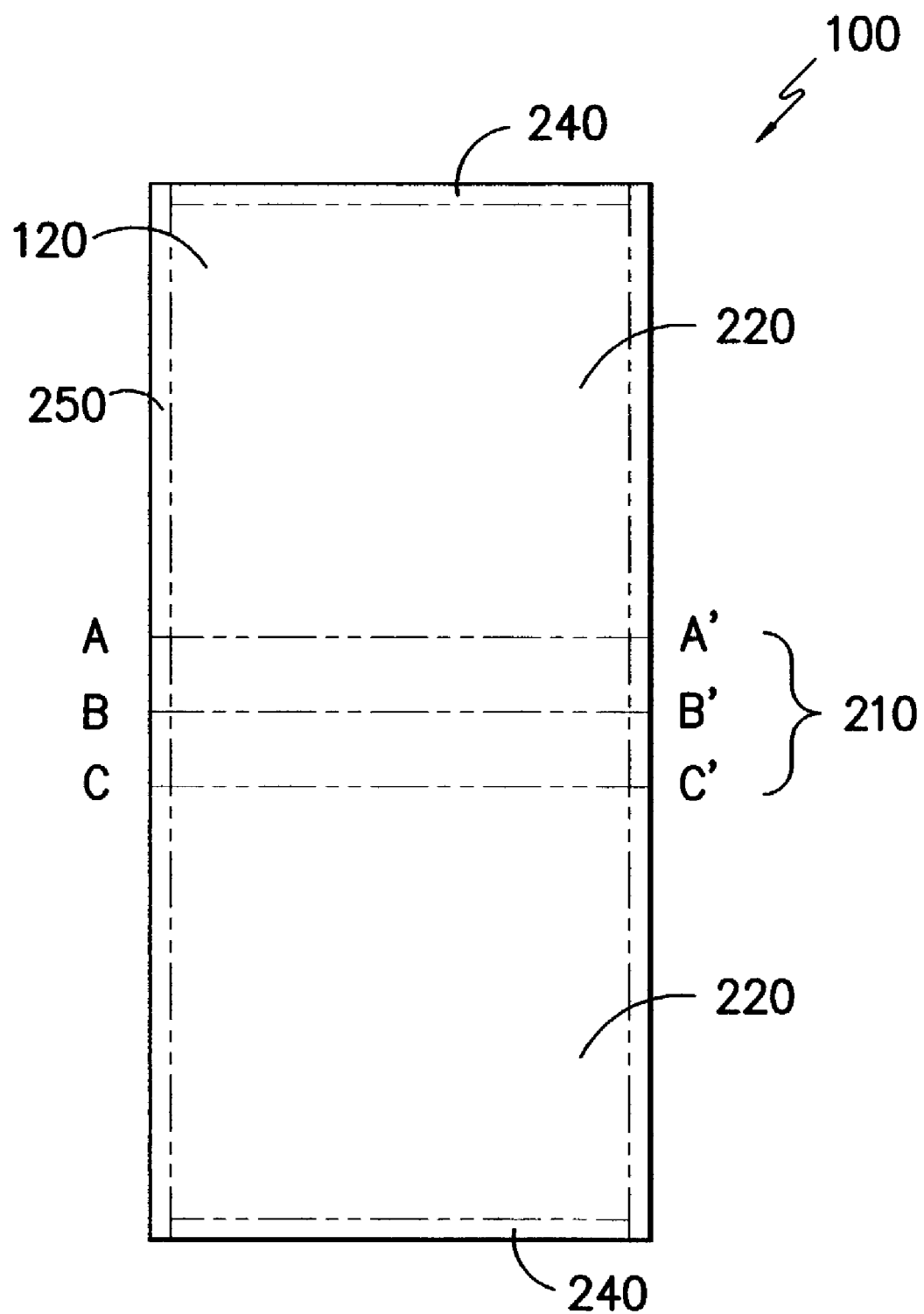
FIG. -3-

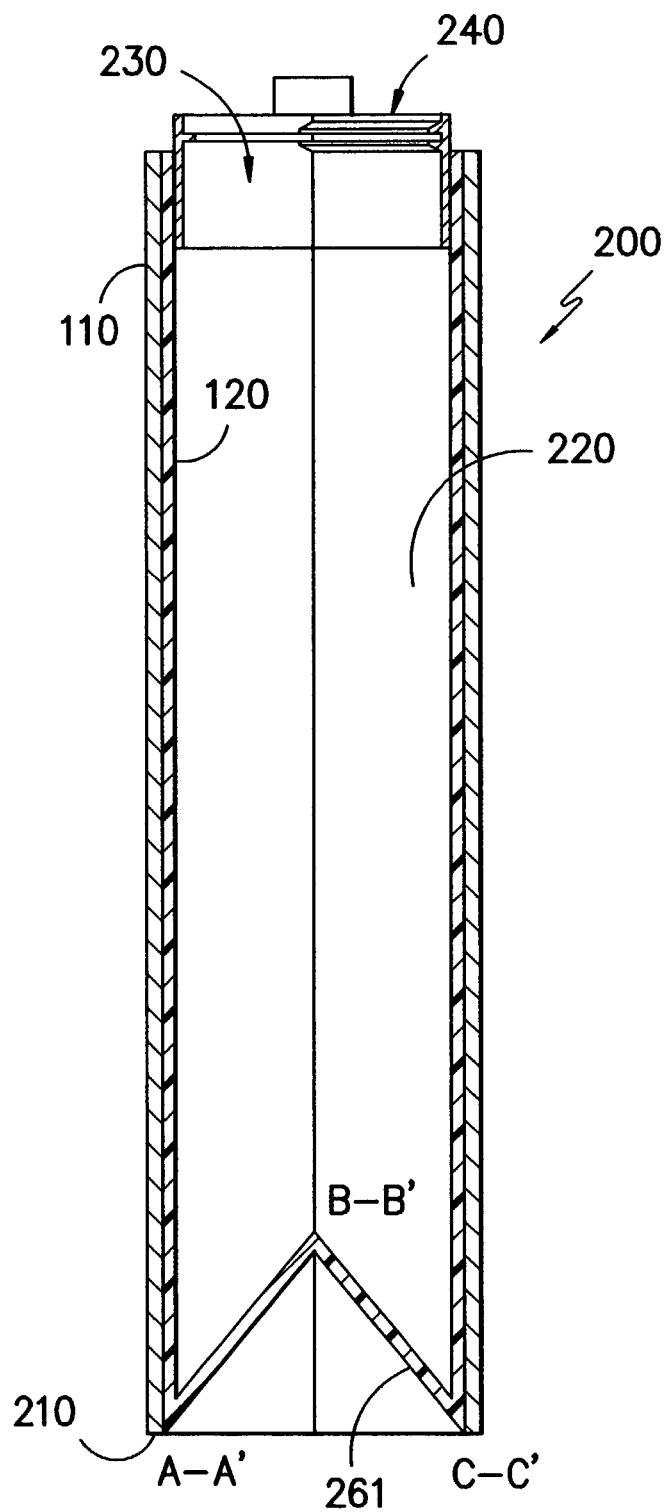
FIG. -4-

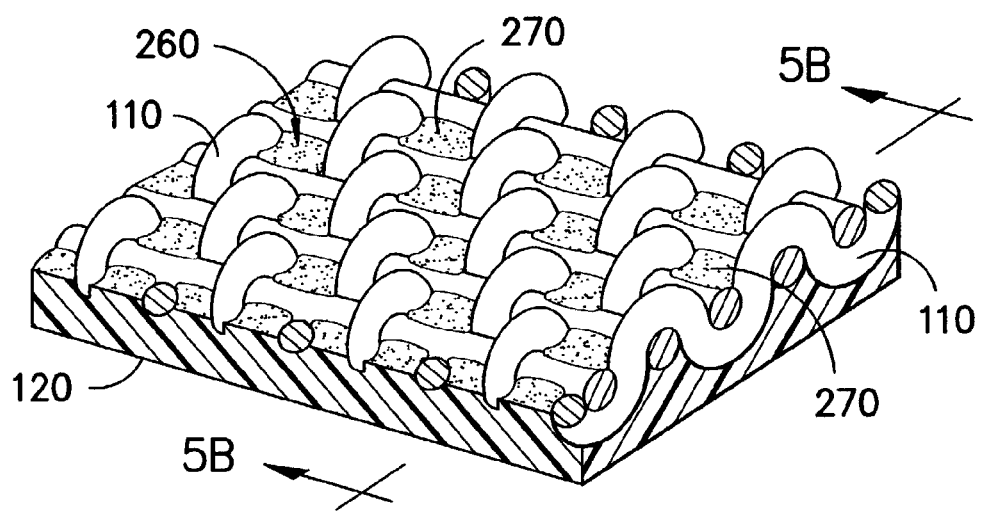
FIG. —5A—
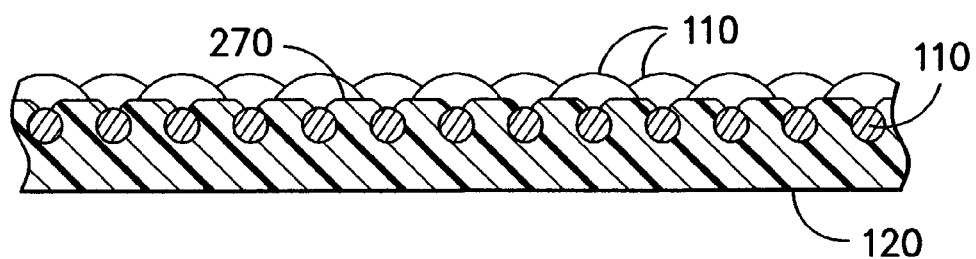
FIG. —5B—

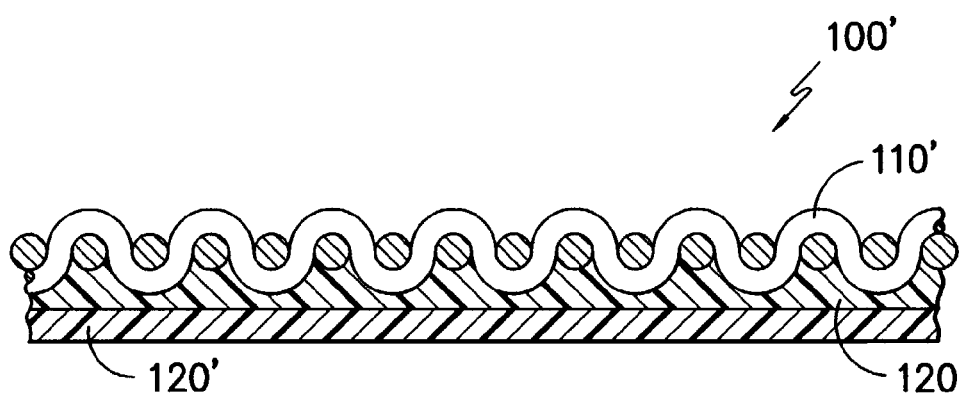
FIG. -6-
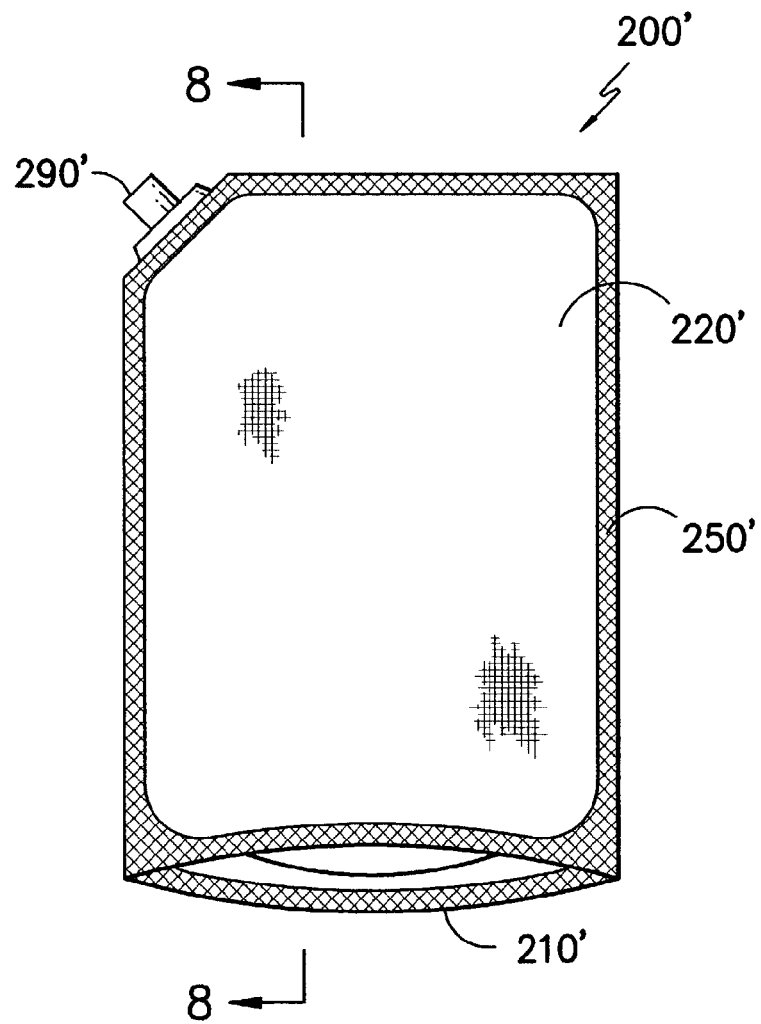
FIG. -7-

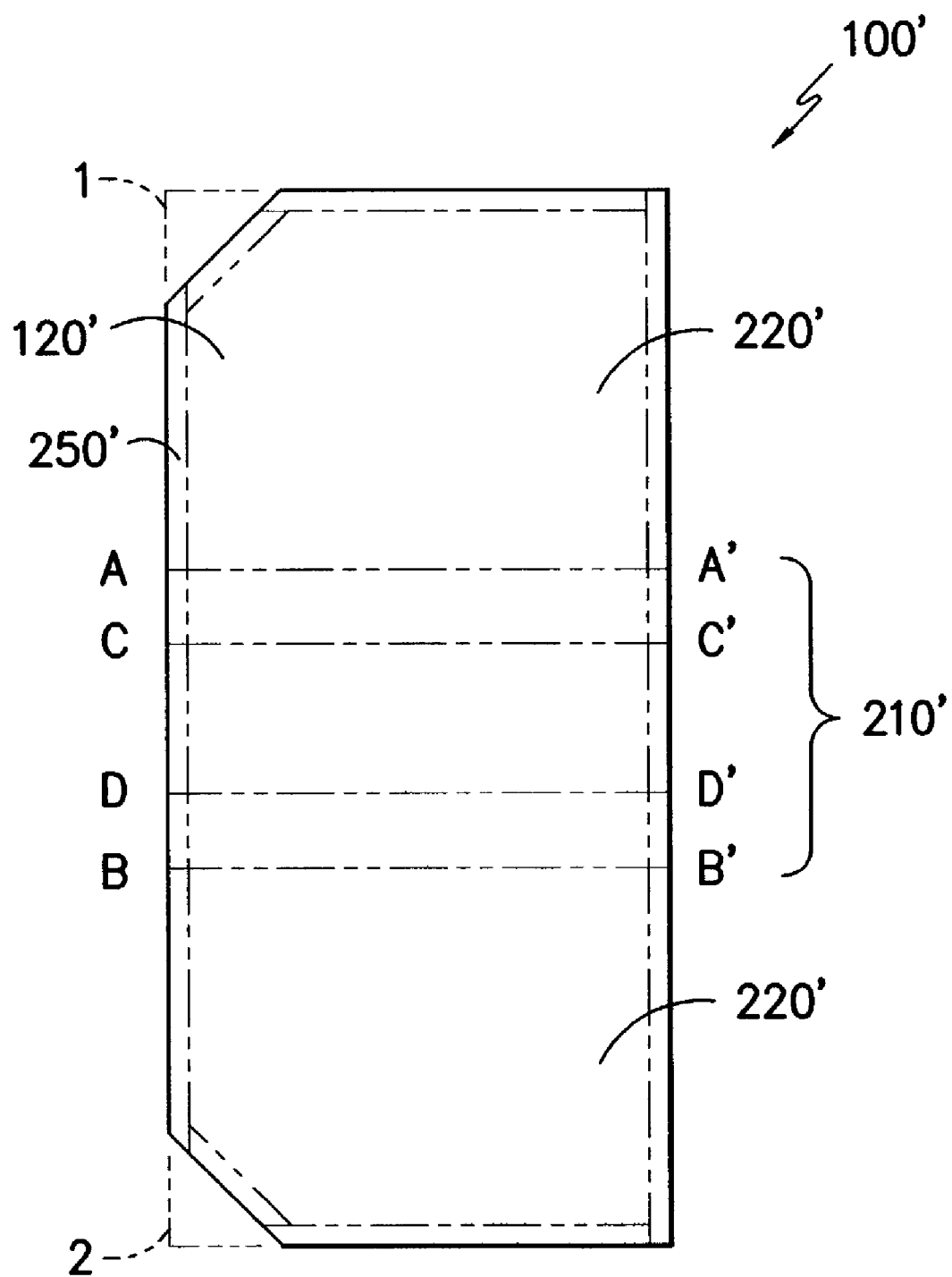
FIG. -8-

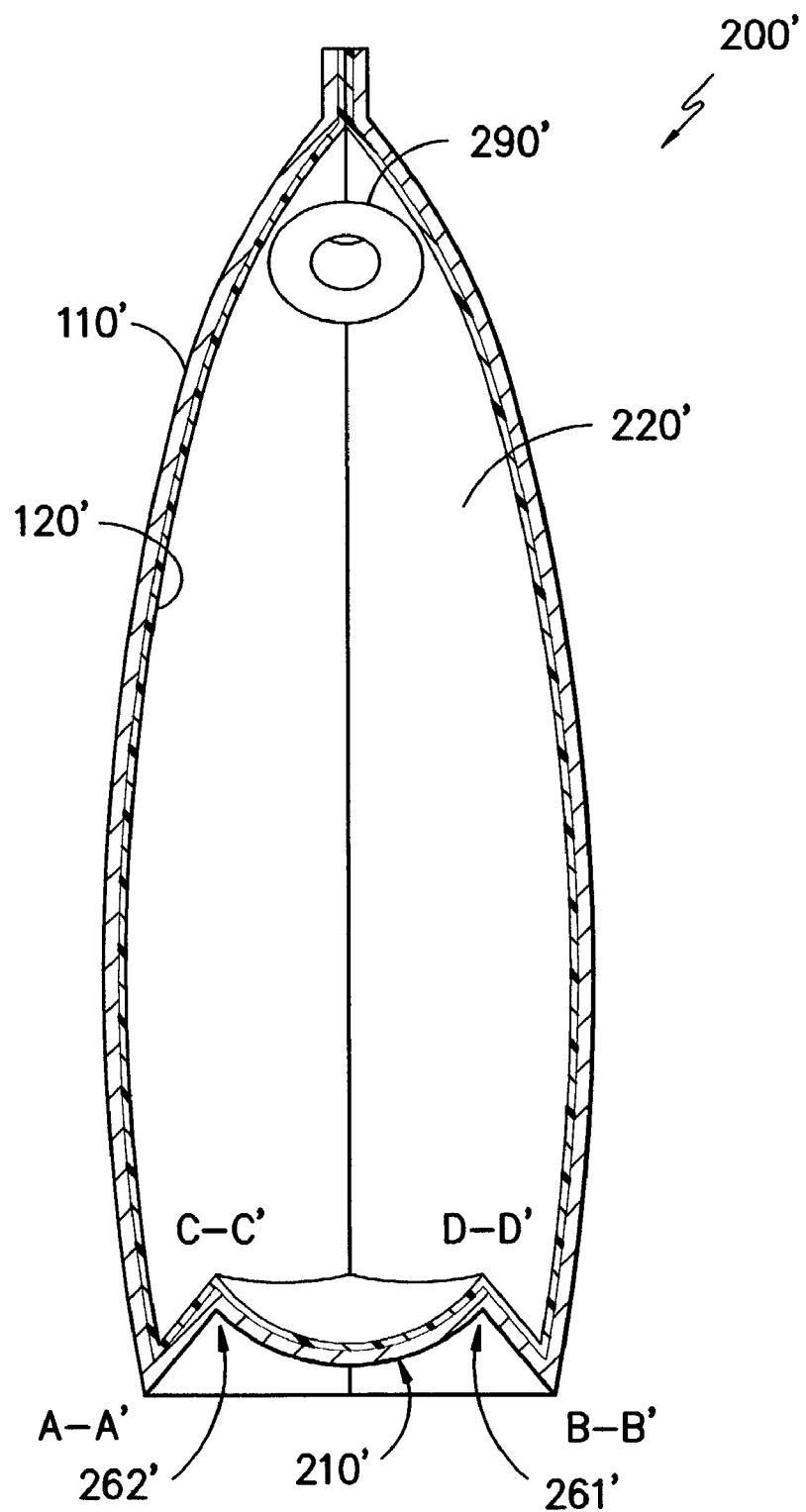
FIG. −9−

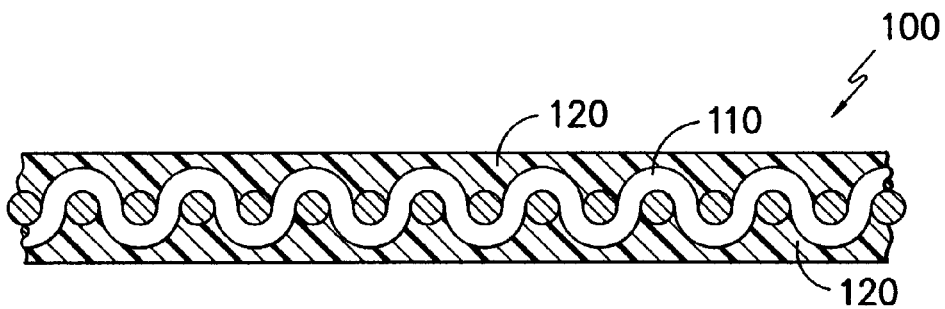
FIG. -10-
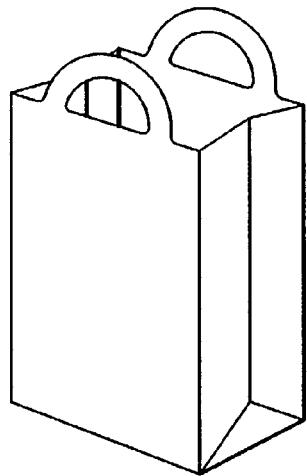  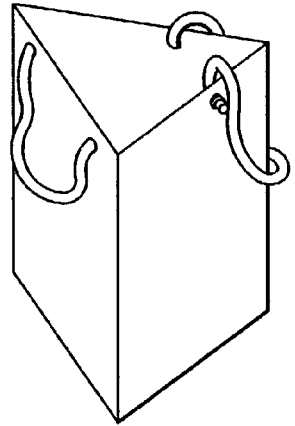
FIG. -11A-   FIG. -11B-
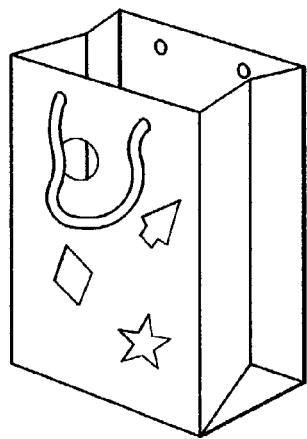  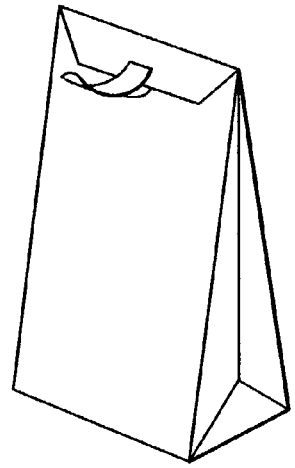
FIG. -11C-   FIG. -11D-

# PACKAGING MATERIAL AND CONTAINERS FORMED THEREFROM

CROSS-REFERENCE TO RELATED APPLICATIONS

This application is a continuation-in-part of and claims priority to U.S. patent application Ser. No. 10/178,417, filed Jun. 24, 2002, now abandoned which claims priority to and the benefit of prior filed U.S. Provisional Patent Application Ser. No. 60/310,771, filed Aug. 8, 2001. Both applications are hereby incorporated by reference.

BACKGROUND OF THE INVENTION

The present invention relates generally to packaging materials and the packaging containers formed therefrom. Currently, most consumer product packaging materials are comprised of laminated paper, vinyl, or plastic. These packaging materials are formed into packaging containers which do not generally offer the advantages available to the consumer that can be achieved with the packaging containers of the present invention. Many of the current packaging containers are composite materials comprised of various layers such as, for example, layers of Kraft paper, laminated films, polyethylene, and the like. These composite materials are typically die cut into various shapes, folded, and adhered together with glue to form a packaging container. These types of containers typically generate a lot of noise during use, and they often are less flexible and durable than the packaging containers of the present invention.

The packaging containers of the present invention provide a novel container for consumer goods and are generally designed to be re-usable after the initial purchase of the packaging container. These packaging containers may provide product differentiation for those companies which utilize them, and they may also be used for image building or for making the point of sale part of the purchasing experience for the consumer. As an example, an upscale department store may provide the packaging container as a shopping bag for consumers making purchases in their stores.

In addition, the packaging container of the present invention may possess limited functionality. For example, the packaging containers may provide protection to volatile products placed inside the container when exposed to high and/or low humidity environments. The containers may be water repellent, gas impermeable, and/or antimicrobial, and they may be ideal for packaging such items as cigars, golf gloves, aroma therapy items, disposable wash clothes, razors, and the like. More specifically, a packaging container which holds a razor for consumer purchase may possess further functional use, for instance, by also having a reflective surface which could be used as a mirror attached to one side of the container so that it would be useful while shaving in the shower.

Furthermore, the packaging container of the present invention may possess multi-functional and attribute specific engineered performance characteristics. Several examples of these characteristics include use of the packaging container as industrial packaging for electronic and instrumentation packaging or for food and/or beverage containment. For example, the packaging container may be used as a refillable beverage container that is able to withstand the atmospheric pressure and temperature changes encountered during air travel. The containers may provide a moisture barrier, liquid barrier, and/or gas transmission barrier between the contents of the container and the surrounding environment. The containers may also be resistant to ultraviolet light, and they may be puncture resistant. Thus, the container may be ideal for use as a replacement to the cans of soft drinks and juice that may be distributed during air travel. As another example, the packaging container may be used to hold snack foods, coffee, cereal, spices, and the like. Additionally, the container may exhibit anti-static characteristics for use with packaging sensitive circuit boards or silicone wafers.

In general, the packaging containers of the present invention are typically less noisy and more flexible and durable than the paper, vinyl, or plastic containers currently available to consumers. The versatility of the packaging container of the present invention features makes it ideal for use in a wide array of end-use applications.

BRIEF DESCRIPTION OF THE DRAWINGS

FIG. 1 is an enlarged cross-sectional view of an embodiment of the packaging material of the present invention.

FIG. 2 is a view of a packaging container formed from the packaging material shown in FIG. 1.

FIG. 3 is a plan view of a layout of the packaging material shown in FIG. 1 for forming the packaging container shown in FIG. 2.

FIG. 4 is a section view of the packaging container shown in FIG. 2 which was taken along section line 4 shown in FIG. 2.

FIG. 5A is an enlarged cross-sectional view of the packaging material of FIG. 1 which shows the anchor structures protruding through the interstices of the textile substrate layer of the packaging material.

FIG. 5B is a side view of the packaging material of FIG. 5A which shows the anchor structures protruding through the interstices of the textile substrate layer of the packaging material.

FIG. 6 is an enlarged cross-sectional view of yet another embodiment of the packaging material of the present invention.

FIG. 7 is a view of a packaging container formed from packaging material shown in FIG. 6.

FIG. 8 is a plan view of the layout of the packaging material for the packaging container shown in FIG. 7.

FIG. 9 is a section view of the packaging container shown in FIG. 7 taken along section line 8 of FIG. 7.

FIG. 10 is an enlarged cross-sectional view of another embodiment of the packaging material of the present invention.

FIGS. 11A-11D are further embodiments of packaging containers that may be formed from the packaging material of the present invention.

DETAILED DESCRIPTION OF THE INVENTION

The flexible, reusable packaging container of the present invention is comprised of a packaging material. The packaging material is comprised of one or more layers of coating disposed on one or more layers of textile substrate. The coating layer may be comprised of a stiffening agent for providing support to the packaging container. The stiffening agent may provide a gas and/or liquid impermeable barrier between the contents of the container and the textile substrate. The stiffening agent may also include chemicals which impart antifungal or antibacterial properties to container. The textile substrate typically provides an aesthetically pleasing feel and appearance to the outside of the packaging container, as well as providing functional attributes to the packaging container such as water repellence, stain resistance, and/or anti-static resistance. The resulting packaging container possesses increased strength, puncture resistance, and resistance to de-lamination over the current paper or plastic packaging containers.

It is contemplated that the textile substrate of the packaging material may be of any known construction including a knit construction, a woven construction, a nonwoven construction, and the like, or combinations thereof. Textile substrates having a woven construction may have between about 30 and about 80 picks per inch. The material of the textile substrate can be synthetic fiber, natural fiber, man-made fiber using natural constituents, or a blend of any of the foregoing. By way of example only, synthetic fibers may include polyester, acrylic, polyamide, polyolefin, polyaramid, polyurethane, or blends thereof. More specifically, polyester may include polyethylene terephthalate, polytrimethylene terephthalate, polybutylene terephthalate, polylactic acid, or combinations thereof. Polyamide may include nylon 6, nylon 6,6, or combinations thereof. Polyolefin may include polypropylene, polyethylene, or combinations thereof. Polyaramid may include poly-p-phenyleneteraphthalamid (i.e., Kevlar®), poly-m-phenyleneteraphthalamid (i.e., Nomex®), or combinations thereof. Exemplary natural fibers include wool, cotton, ramie, jute, flax, or blends thereof. Exemplary man-made materials using natural constituents include regenerated cellulose (i.e., rayon), lyocell, or blends thereof.

The textile substrate may be formed from staple fiber, filament fiber, slit film fiber, or combinations thereof. The fiber may be exposed to one or more texturing processes. The fiber may then be spun or otherwise combined into yarns, for example, by ring spinning, open-end spinning, air jet spinning, vortex spinning, or combinations thereof. Accordingly, the textile substrate will generally be comprised of interlaced fibers, interlaced yarns, loops, or combinations thereof.

The textile substrate may be comprised of fibers or yarns of any size, including microdenier fibers or yarns (fibers or yarns having less than one denier per filament). The fibers or yarns may have deniers that range from less than about 1 denier per filament to about 2000 denier per filament or more preferably, from less than about 1 denier per filament to about 500 denier per filament.

Furthermore, the textile substrate may be partially or wholly comprised of multi-component or bi-component fibers or yarns in various configurations such as, for example, islands-in-the-sea, core and sheath, side-by-side, or pie configurations. Depending on the configuration of the bi-component or multi-component fibers or yarns, the fibers or yarns may be splittable along their length by chemical or mechanical action.

The textile substrate may be printed or dyed, for example, to create aesthetically pleasing decorative designs on the substrate or to print informational messages on the substrate. The textile substrate may be colored by a variety of dyeing and/or printing techniques, such as high temperature jet dyeing with disperse dyes, thermosol dyeing, pad dyeing, transfer printing, screen printing, digital printing, ink jet printing, flexographic printing, or any other technique that is common in the art for comparable, equivalent, traditional textile products. In addition, the fibers or yarns comprising the textile substrate of the current invention may be dyed by suitable methods prior to substrate formation, such as for instance, via package dyeing or solution dyeing, or they may be left undyed. In one embodiment, the textile substrate layer may be printed according to the method disclosed in commonly assigned U.S. patent application Ser. No. 09/943,920 filed on Aug. 31, 2001, which is hereby incorporated by reference. This U.S. patent application discloses treatment of a textile substrate with a composition having a dye fixing agent, such as a reactive amino compound, and an ink receiving agent, such as inorganic particles, for the subsequent printing with an ink jet printer.

The textile substrate may be further treated with other chemical finishes. For example, it may be desirable to treat the textile substrate with finishes containing chemicals such as water repellants, soil release agents, antimicrobial agents, antibacterial agents, anti-fungal agents, flame retardants, UV inhibitors, antioxidants, coloring agents, lubricants, anti-static agents, fragrances, and the like, or combinations thereof. Chemical application may be accomplished by immersion coating, padding, spraying, foam coating, or by any other technique whereby one can apply a controlled amount of a liquid suspension to a textile substrate. Employing one or more of these application techniques may allow the chemical to be applied to the textile substrate in a uniform manner.

The textile substrate may also be treated with mechanical finishes. For example, it may be desirable to expose the textile substrate to mechanical finishes such as calendering, embossing, etching, rainbow or hologram embossing, film or metal foil hologram embossing, fabric metallization, heat setting, sanforizing, glazing, schreinering, sueding, sanding, emorizing, napping, shearing, tigering, decating, fabric patterning through the use of water, air, or patterned rolls, and the like, or combinations thereof. These mechanical treatments typically provide desirable finishes to the textile substrate which affect such properties as the appearance, strength, and/or hand (or feel) of the fabric.

The packaging material of the present invention further includes one or more layers of coating which typically include a stiffening agent. Stiffening agents are often referred to as "hand builders," which are rigid, polymeric, and flexible materials that form a film around fibers or yarns. Hand builders are typically used to increase the weight of the fabric, improve the toughness and abrasion resistance of the fabric, and/or to stiffen the fabric. The stiffening agents applied to the textile substrate are contemplated to provide increased strength to the packaging material of the present invention and may provide increased strength to the seams of the packaging container formed from the packaging material.

The stiffening agents applied to the packaging material of the present invention are typically comprised of at least one layer of a primary stiffening agent, and may further be comprised of at least one layer of a secondary stiffening agent. The primary stiffening agent is generally disposed directly on the textile substrate, while the secondary stiffening agent is disposed directly on the primary stiffening agent layer. The primary stiffening agent includes thermoplastic materials, thermoset materials, or combinations thereof. The secondary stiffening agent includes such materials as film, paper, foil, or combinations thereof. The film can include thermoplastic materials, thermoset materials, or combinations thereof. Thermoplastic or thermoset materials may include polyolefin, polyester, polyamide, polyurethane, acrylic, silicone, melamine compounds, polyvinyl acetate, polyvinyl alcohol, nitrile rubber, ionomers, polyvinyl chloride, polyvinylidene chloride, chloroisoprene, or combinations thereof. The polyolefin may be polyethylene, polypropylene, ethylvinyl acetate, ethylmethyl acetate, or combinations thereof.

The primary stiffening agent can generally be applied to a textile substrate as a latex emulsion, solvated polymer, molten polymer, powder, or film by any appropriate conventional means known to those skilled in the art. Suitable methods for application may comprise various coating methods, such as, for example, immersion, knife/comma, roll, gravure, pad/nip, pad/vacuum, hot melt, powder, or extrusion coating, or various laminating methods, such as with adhesive lamination or heat and pressure lamination. Some of these application techniques allow the primary stiffening agent to encapsulate the fibers or yarns or loops of the textile substrate.

One embodiment includes immersion coating both sides of the textile substrate with the primary stiffening agent by submersing the textile substrate in an aqueous solution that contains the primary stiffening agent. The packaging material is then typically exposed to heat in order to drive off excess liquid and cure the primary stiffening agent. The primary stiffening agent add on values using this application method may be between about 1 and about 50 percent by weight on weight of the textile substrate, or more preferably between about 3 and about 35 percent by weight on weight of the textile substrate.

Another alternative for coating both sides of the textile substrate with a primary stiffening agent includes coating a first side of the textile substrate with a first primary stiffening agent and coating a second side of the textile substrate with a second primary stiffening agent. For example, acrylic latex may be applied to the first side of the textile substrate by pad/nip coating, and a film may be extrusion coated to the second side of the substrate.

In yet another embodiment, the primary stiffening agent may be applied to only one side of the textile substrate by any conventional coating application known to those skilled in the art such as, for example by knife coating, transfer roll coating, spray coating, powder coating, and the like. The packaging material is then typically exposed to heat in order to drive off excess liquid and cure the primary stiffening agent. Typically, the primary stiffening agent layer applied in this manner may have add on values between about 1 and about 200 percent by weight on weight of the textile substrate, or more preferably between about 3 and about 100 percent by weight on weight of the textile substrate.

Yet another method applies the primary stiffening agent to the textile substrate by extrusion coating, in which the primary stiffening agent is extruded in the form of a molten curtain that is applied to the substrate, followed by the application of pressure (as from a nip roll, which typically presses against a chill roll) to force the cooling but still fluid primary stiffening agent into the structure of the substrate. Typically, the extruded primary stiffening agent layer may have a thickness that ranges between about 1 and about 5 mils, and more preferably between about 2 and about 3 mils.

Preferably, the primary stiffening agent application process is performed in such a fashion that the resulting primary stiffening agent layer is firmly attached to the textile substrate and effectively penetrates and seals at least a portion— perhaps substantially all—of the interstices between the fibers, yarns, or loops of the textile substrate and forms spot-bonds between adjacent fibers, yarns, or loops. For example, when the primary stiffening agent is applied to a first side of a woven textile substrate, it may at least partially fill the interstices of the textile substrate and form anchoring structures on a second side of the woven textile substrate.

These anchoring structures on the second side of the textile substrate have their largest diameter greater than that of the interstices in the woven textile substrate (similar to a flattened mushroom head) so as to increase resistance to de-lamination of the woven textile substrate from the primary stiffening agent layer. Accordingly, packaging containers comprising textile substrate composites that include such anchoring structures are highly resistant to de-lamination between the woven textile substrate component and the primary stiffening agent. The use of textured yarns and/or spun yarns as compared with untextured multi-filament yarns in woven or knitted substrates can provide textile composites having increased resistance to de-lamination. Thus, it is contemplated that the formation of these anchoring structures has led to a substantial increase in the adhesion between the textile substrate and the primary stiffening agent.

It is also contemplated that textile substrates such as, for example, those having a knit or nonwoven construction, may allow the primary stiffening agent to penetrate interstices in the textile substrate to form anchoring structures within the textile substrate that do not protrude completely through to the second side of the textile substrate. For example, the interstices formed by the loops of a knit construction or the fibers of a nonwoven construction may provide additional space for the primary stiffening agent applied to the first side of a textile substrate to form anchoring structures and attach itself within the textile substrate before penetrating entirely through to the second side of the textile substrate. Furthermore, this phenomenon may also occur when the primary stiffening agent application method does not provide sufficient pressure to force the primary stiffening agent entirely through the textile substrate so that anchoring structures may be formed on the second side (or the exterior surface) of the textile substrate.

A further embodiment of the present invention includes application of the primary stiffening agent to the textile substrate by any of the previously described methods as well as the simultaneous or successive application of a secondary stiffening agent to the primary stiffening agent. The secondary stiffening agent layer is generally applied to the primary stiffening agent layer by the process of lamination, for example, by laminating a pre-formed film to the primary stiffening agent. The secondary stiffening agent layer typically has a thickness of between about 1 and about 20 mils, and more preferably between about 1 and about 10 mils. In one embodiment, the secondary stiffening agent may be a foil that is laminated to the primary stiffening agent layer. In another embodiment, one or more additional layers of film may also be attached to the foil to provide further protection between the contents of the packaging container and the outside environment. The film layer may be attached to the foil by laminating the entire film to the foil or by laminating only a portion of the film to the foil. For example, the layers may be joined together by laminating only the portion of the foil and film that will form the bottom of the packaging container.

Various additives may be added to the primary and/or secondary stiffening agent to impart certain properties to the packaging container depending on the end-use of the container. For example, slip agents may be added to improve processing of the stiffening agent, for example, by assisting in reducing the packaging material's coefficient of friction. The slip agents may comprise fatty acid amides such as, for example, erucumide, oleoamide, stearamide, and the like. Slip agents may also include talc. Lubricants may also be added to the stiffening agent for additional assistance in processing the stiffening agent, again, for example, by aiding in the reduction of the packaging material's coefficient of friction. The lubricants may comprise fatty acid amides and specialty esters such as, for example, bis stearmide, stearic acid, glycerol mono stearate, and the like. It may be preferable that the coefficient of friction of the packaging material which forms the packaging container is less than about 0.7, when tested according to ASTM D 1894 and specifying that the coated side of the packaging material is contacted with the coated side of the packaging material. It may be even more preferable that the coefficient of friction of the packaging material is less than about 0.3.

Other additional additives may be added to the primary and/or secondary stiffening agent such as, for example, antimicrobial agents, antibacterial agents, anti-fungal agents, flame retardants, UV inhibitors, antioxidants, coloring agents, anti-static agents, fragrances, and the like, or combinations thereof. The primary and/or secondary stiffening agent layer may also be dyed or printed, for example, to create aesthetically pleasing patterns or to print informational messages on the surface of the primary and/or secondary stiffening agent layer.

The packaging material of the present invention, which is comprised of one or more layers of stiffening agent disposed on one or more layers of textile substrate may be formed into a packaging container of substantially any shape. The packaging container may be formed in a two-dimensional or a three-dimensional shape. The shapes may be geometric solids comprising rectangles, squares, cylinders, tetrahedrons, rounded tetrahedrons, pyramids, tangles, and the like.

The packaging material may be formed into a packaging container of substantially any height, width, or depth. For example, a container as shown in FIG. 2 may be about 8 inches tall, about 6 inches wide, and about 2 inches deep, and the container shown in FIG. 7 may be about 14 inches tall, about 8 inches wide, and about 4 inches deep. The interior volume of the packaging container may be of substantially any amount. The volume may be altered, for example, by the size of the packaging container and by the number of gussets in the packaging container.

During assembly of the packaging container, the packaging material is typically available as continuous roll stock which is cut to the appropriate length depending upon the dimensions of the packaging container to be formed. The packaging material may be formed into a packaging container by a variety of assembly techniques which include, for example, sewing, pressure sensitive adhesion, gluing, heat lamination, and the like, or combinations thereof. One or more gussets may be formed in the bottom of the container, in one or more sides of the container, or a combination thereof, while some containers may not have any gussets. The gussets may provide additional support to the container, and in some instances, may assist in creating a self-supporting container. The gussets may also result in an expandable container which has increased volume inside the container. Some packaging containers may also include a piece of cardboard, a piece of cardboard wrapped in a plastic or vinyl material, a stiff plastic material, and the like, which can be placed in the bottom of the container for additional assistance in creating a self-supporting container.

In one potentially preferred non-limiting embodiment, the packaging container may include one or more closures. The closure may comprise a rail fastener, a rail fastener with slider, a press to close mechanism, a zipper, a hook and loop combination, a drawstring, buttons, snaps, and the like, or combinations thereof. The packaging container may also have one or more perforated edges which may be forcibly removed to allow access to the contents of the container. In one embodiment, the packaging container may have a press to close mechanism for closing the container after the perforated edge has been removed.

In another embodiment, the packaging container may include one or more handles to assist in carrying the container. The handles may be comprised of twisted paper, cord, drawstring, macramé, die cut shapes, textile substrates, plastic materials, and the like, or combinations thereof. For example, the handles may be constructed of a textile substrate, such as, for example, woven polyester or nylon, or ribbon. The handles may be attached to the packaging container by sewing, adhesive, lamination, grommets, and the like, or combinations thereof.

In one embodiment, the handles and the closure for the packaging container may be combined into one mechanism. For example, the handles may be comprised of a plastic material having male protrusions on the interior side of one handle which match female openings on the interior side of the facing handle. When lined up with each other, the male and female portions typically fit together with the application of a small amount of pressure to close the packaging container.

In a further embodiment, the packaging container may include means for dispensing the contents of the container. In one embodiment, the contents may be a liquid. The dispensing means may allow for the contents of the container to be released in a controlled manner. The dispensing means may comprise twist caps, snap caps, spouts, fitments, and the like.

The packaging container, in yet another embodiment, may possess a vacuum fitting or other opening which can be used to vacuum seal the packaging container. Vacuum sealing generally removes the air from within the packaging container and thereby assists in prolonging the freshness of the product placed in the packaging container.

In a further embodiment, the packaging container may possess an opening in one or more of its side walls. The opening can be used to provide a window to the packaging container so that the contents of the packaging container may be seen without actually opening the container. The opening may be made by die cutting the textile substrate in a variety of shapes. The opening may then be covered with a clear film layer, such as a primary stiffening agent as disclosed herein, which may be laminated to substantially the entire surface of the textile substrate. Alternatively, the opening may be covered with a clear film layer which is laminated only to the area of the textile substrate surrounding the opening. A further embodiment includes laminating the opening with a reflective material, such as foil, either by laminating the entire surface of the textile substrate with the foil or by laminating only the portion of the textile substrate immediately surrounding the opening.

Referring now to the Figures, and in particular to FIG. 1, there is shown an enlarged cross-sectional view of an embodiment of packaging material 100 of the present invention. The packaging material 100 generally includes a textile substrate layer 110 and a primary stiffening agent layer 120. As illustrated in FIG. 1, the textile substrate layer 110 may be a woven polyester fabric. The warp yarns of the textile layer 110 can be 1/150/34 or 36 denier textured polyester yarn, and the fill yarns can be 1/150/48 or 50 denier textured polyester yarn. Also as illustrated in FIG. 1, the primary stiffening agent layer 120 may be a thermoplastic material. In one embodiment, the thermoplastic material can be a polyolefin, such as polyethylene. The polyethylene may be a low density polyethylene. In another embodiment, the polyolefin can be a polypropylene. In a preferred embodiment, the primary stiffening layer 120 will have a softening point temperature lower than the textile substrate layer 110, and preferably 40 degrees C. lower. This typically allows the packaging material to be heat sealed to form the packaging container without damaging the textile substrate layer. As previously disclosed, the primary stiffening layer 120 can be joined with the textile substrate layer 110 through extrusion coating or any other conventional coating application methods such as knife coating or spray coating or as otherwise disclosed herein.

The textile substrate layer 110 can be treated with a water repellant, such as a fluorochemical, to provide the exterior of the textile substrate layer 110 with water and/or stain resistance. As previously mentioned, various other treatments can be incorporated into the textile substrate layer 110, incorporated into the primary stiffening agent layer 120, and/or disposed over the textile substrate layer 110 of the material 100, such as soil release agents, antimicrobial agents, antibacterial agents, anti-fungal agents, flame retardants, UV inhibitors, antioxidants, coloring agents, lubricants, slip agents, anti-static agents, fragrances, and the like, or combinations thereof.

Referring now to FIG. 2, there is illustrated a packaging container 200 formed from the packaging material 100 in FIG. 1. The packaging container 200 generally includes a bottom 210, side walls 220, and an open end 230. The packaging container 200 also includes edges 250 and may include a closure 240. As shown in FIG. 3, the packaging container 200 can be formed by folding a rectangular section of the packaging material 100 and applying heat to the edges 250 to form the container shape. The packaging material 100 shown in FIG. 3 is oriented with the primary stiffening agent layer 120 facing up and the textile substrate layer 110 facing down. The packaging material 100 is folded along fold line B-B' such that fold line B-B' protrudes upwardly (out of the page). The packaging material 100 is then folded along fold lines A-A' and C-C' such that each of the fold lines A-A' and C-C' protrude downwardly (into the page). As shown in FIGS. 2 through 4, after the container shape is formed, a closure 240 can be positioned inside the open end 230 of the container 200, and secured by applying heat to the container 200 along the open end 230. As previously discussed, the closure 240 can be a rail fastener, rail fastener with slider, press to close mechanism, zipper, hook and loop combination, drawstring, buttons, snaps, or the like.

In a further embodiment, as shown in FIG. 4, the textile substrate layer 110 of the material 100 can be removed in the gusset area 261 prior to forming the container 200, in order to form gussets in the bottom 210 of the container 200 for added support. In one embodiment, the packaging material 100 has a sufficient stiffness that the container 200 can stand on the bottom 210 without the material 100 folding over in the areas of the sides 220.

Referring now to FIGS. 5A and 5B, the exterior of the textile substrate layer 110 may possess anchoring structures 270 which extend from the primary stiffening agent layer 120 through the interstices 260 of the textile substrate layer 110. The anchoring structures 270 typically have flattened heads which are larger in diameter than the diameter of the interstices 260 of the textile substrate layer 110. As previously discussed, these anchoring structures 270 assist in preventing de-lamination of the primary stiffening agent layer 120 from the textile substrate layer 110, and they may further provide additional strength to the seams of the packaging container.

In yet another embodiment as shown in FIGS. 6 through 9, the packaging container 200' may be formed of a packaging material 100'. As shown in FIG. 6, packaging material 100' may further include a secondary stiffening agent layer 120' which is disposed on top of primary stiffening agent layer 120 by any conventional means and may, for example, be disposed by the process of lamination. The secondary stiffening agent layer 120' may be a film. The film may be a thermoplastic or thermoset material such as low density polyethylene. In yet another embodiment, the secondary stiffening agent 120' may be a multi-layer film comprised of a thermoplastic or thermoset material. The multi-layer film may have a thickness of about 4.2 mils. In a preferred embodiment, the film will have a softening point temperature lower than the textile substrate layer 110', preferably 40 degrees C. lower. In a more preferred embodiment, the outer most layer of the multi-layer film will have a softening point temperature lower than any of the other layers of the multi-layer film, and preferably 40 degrees C. lower. This allows the packaging material to be heat sealed to form the packaging container without damaging the textile substrate or melting any of the other layers of the multi-layer film. FIG. 7 shows packaging container; 200' generally includes a bottom 210', side walls 220', and edges 250'. Packaging container 200' may further include a dispensing means 290' for removing the contents of the packaging container 200'.

As shown in FIG. 8, the packaging container 200' can be formed by folding a rectangular section of packaging material 100' and applying heat to the edges 250' to form the container shape. Corners 1 and 2 may be cut at an angle and removed for placement of dispensing means 290'. The packaging material 100' is oriented with the secondary stiffening agent layer 120' facing up and the textile substrate layer 110' facing down. The packaging material 100' is folded along fold lines A-A' and B-B' such that each of the fold lines A-A' and B-B' protrude downwardly (into-the page). The packaging material 100' is then folded along fold lines C-C' and D-D' such that each of the fold lines C-C' and D-D' protrude upwardly (out of the page). As shown in FIG. 9, gussets 261' and 262' are formed in bottom 210'.

FIG. 10 depicts yet another embodiment of the packaging material of the present invention. Packaging material 100 may be comprised of textile substrate 110 having primary stiffening agent 120 disposed on both surfaces of textile substrate 110. The primary stiffening agent 120 may be polyvinyl acetate, polyvinyl alcohol, starch, and the like. The primary stiffening agent 120 may be applied to textile substrate 110 by any conventional coating method, such as, for example, by immersion coating textile substrate 110 in an aqueous solution of primary stiffening agent 120. The packaging material 100 may then be formed into a packaging container, such as, for example, like those shown in FIGS. 11A-11D.

FIGS. 11A through 11D illustrate a few more examples of contemplated embodiments of the packaging container of the present invention. FIG. 11A illustrates a self-supporting open rectangular packaging container with diecut handles and side gussets. FIG. 11B illustrates a self-supporting open triangular packaging container with corded handles. FIG. 11C illustrates a self-supporting open rectangular packaging container with die cut shapes in the side of the container, side gussets, and corded handles. FIG. 11D illustrates a self-supporting envelope packaging container with a ribbon closure and side gussets.

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

We claim:

1. A flexible, reusable packaging container formed of a packaging material comprising:
   a textile substrate,
      wherein the textile substrate has a first surface and a second surface, and
      wherein the textile substrate is comprised of interlaced fibers or yarns or loops which form interstices in the textile substrate; and
   a primary stiffening agent,
      wherein the primary stiffening agent is disposed on the first surface of the textile substrate,
      wherein the primary stiffening agent penetrates into the interstices to form anchoring structures that extend through the interstices and terminate on or within the second side of the textile substrate, and
      wherein the anchoring structures have diameters that are greater than the diameter of the interstices in the textile substrate.

2. The packaging container of claim 1, wherein the packaging material has a coefficient of friction of less than about 0.7 when tested according to ASTM D 1894.

3. The packaging container of claim 1, wherein the packaging material has a coefficient of friction of less than about 0.3 when tested according to ASTM D 1894.

4. The packaging container of claim 1, wherein the textile substrate is comprised of a woven construction, a knit construction, a nonwoven construction, or combinations thereof.

5. The packaging container of claim 1, wherein the textile substrate is dyed, printed, undyed, or combinations thereof.

6. The packaging container of claim 1, wherein the primary stiffening agent add on values are between about 1 and about 200 percent by weight on weight of the textile substrate.

7. The packaging container of claim 1, wherein the primary stiffening agent add on values are between about 3 and about 100 percent by weight on weight of the textile substrate.

8. The packaging container of claim 1, wherein the primary stiffening agent is dyed, printed, undyed, or combinations thereof.

9. The packaging container of claim 1, wherein the primary stiffening agent further includes one or more chemicals comprised of slip agents, lubricants, antimicrobial agents, antibacterial agents, antifungal agents, flame retardants, UV inhibitors, antioxidants, coloring agents, antistatic agents, fragrances, or combinations thereof.

10. The packaging container of claim 1, wherein the packaging container comprises a rectangle, square, cylinder, tetrahedron, rounded tetrahedron, pyramid, or triangle.

11. The packaging container of claim 1, wherein the packaging container is three dimensional.

12. The packaging container of claim 1, wherein the packaging container is comprised of a bottom, at least two side walls, and an open end.

13. The packaging container of claim 1, wherein the packaging container has one or more gussets, and wherein the gussets are in the bottom, the side, or both the bottom and side of the packaging container.

14. The packaging container of claim 1, wherein the packaging container further includes a cardboard-or stiff plastic material placed in the bottom of the packaging container.

15. The packaging container of claim 1, wherein a closure is attached to the open end of the packaging container, and wherein the closure comprises a rail fastener, rail fastener with slider, a press to close mechanism, a zipper, a hook and loop combination, a drawstring, buttons, snaps, or combinations thereof.

16. The packaging container of claim 1, wherein the packaging container further includes one or more handles, wherein the handles comprise twisted paper, cord, drawstring, macrame, die cut shapes, textile substrates, plastic materials, or combinations thereof.

17. The packaging container of claim 1, wherein the packaging container further includes a vacuum fitting for vacuum sealing the packaging container.

18. The packaging container of claim 1, wherein the packaging container is self-supporting.

19. The packaging container of claim 1, wherein the packaging material provides one or more functional properties to the packaging container selected from the group consisting of moisture barrier, liquid barrier, gas impermeable barrier, ultraviolet light barrier, puncture resistant barrier, antimicrobial barrier, low and/or high humidity environment barrier, low and/or high atmospheric pressure barrier, and low and/or high temperature barrier.

20. The packaging container of claim 1, wherein the textile substrate is exposed to one or more chemical treatments, one or more mechanical treatments, or combinations thereof.

21. The packaging container of claim 20, wherein one or more chemical treatments include treatment of the textile substrate with water repellents, soil release agents, antimicrobial agents, antibacterial agents, anti-fungal agents, flame retardants, UV inhibitors, antioxidants, coloring agents, lubricants, anti-static agents, fragrances, or combinations thereof.

22. The packaging container of claim 20, wherein one or more mechanical treatments include treatment of the textile substrate with calendering, embossing, etching, rainbow or hologram embossing, film or metal foil hologram embossing, fabric metallization, heat setting, sanforizing, glazing, schreinering, sueding, sanding, emorizing, napping, shearing, tigering, decating, fabric patterning through the use of water, air, or patterned rolls, or combinations thereof.

23. The packaging container of claim 1, wherein the textile substrate is comprised of synthetic fibers, natural fibers, man-made fibers using natural constituents, or blends thereof.

24. The packaging container of claim 23, wherein the synthetic fibers are comprised of polyester, acrylic, polyamide, polyolefin, polyaramid, polyurethane, or blends thereof.

25. The packaging container of claim 23, wherein the natural fibers are comprised of wool, cotton, ramie, jute, flax, or blends thereof.

26. The packaging container of claim 23, wherein the man-made fibers using natural constituents are comprised of regenerated cellulose, lyocell, or blends thereof.

27. The packaging container of claim 23, wherein the textile substrate is comprised of microdenier fibers.

28. The packaging container of claim 23, wherein the textile substrate is comprised of multi-component or bi-component fibers or yarns which may be splittable along their length by chemical or mechanical action.

29. The packaging container of claim 1, wherein the primary stiffening agent is comprised of thermoplastic materials, thermoset materials, or combinations thereof.

30. The packaging container of claim 29, wherein the thermoplastic or thermoset materials are comprised of polyolefin, polyester, polyamide, polyurethane, acrylic, silicone, melamine compounds, polyvinyl acetate, polyvinyl alcohol, nitrile rubber, ionomers, polyvinyl chloride, polyvinylidene chloride, chloroisoprene, or combinations thereof.

31. The packaging container of claim 1, wherein the packaging container possesses an opening in at least one side wall of the packaging container.

32. The packaging container of claim 31, wherein the opening is a window having a clear film laminated to the textile substrate.

33. The packaging container of claim 31, wherein the opening is a reflective surface having a foil laminated to the textile substrate.

34. The packaging container of claim 1, wherein the packaging container possesses a reflective surface on at least one side wall of the packaging container.

35. The packaging container of claim 34, wherein the reflective surface could be used as a mirror.

36. A flexible, reusable packaging container formed of a packaging material comprising:
 a textile substrate,
  wherein the textile substrate has a first surface and a second surface, and
  wherein the textile substrate is comprised of interlaced fibers or yarns or loops which form interstices in the textile substrate;
 a primary stiffening agent,
  wherein the primary stiffening agent is disposed on the first surface of the textile substrate,
  wherein the primary stiffening agent penetrates into the interstices to form anchoring structures that extend through the interstices and terminate on or within the second side of the textile substrate, and
  wherein the anchoring structures have diameters that are greater than the diameter of the interstices in the textile substrate; and
 a secondary stiffening agent,
  wherein the secondary stiffening agent is disposed on the primary stiffening agent.

37. The packaging container of claim 36, wherein the secondary stiffening agent has a thickness of between about 1 and about 20 mils.

38. The packaging container of claim 36, wherein the secondary stiffening agent has a thickness of between about 1 and about 10 mils.

39. The packaging container of claim 36, wherein the secondary stiffening agent is dyed, printed, undyed, or combinations thereof.

40. The packaging container of claim 36, wherein the packaging container further includes a means for dispensing items from within the packaging container, and wherein the means for dispensing comprise twist caps, snap caps, spouts, fitments, or combinations thereof.

41. The packaging container of claim 36, wherein the secondary stiffening agent is comprised of film, paper, foil, or combinations thereof.

42. The packaging container of claim 41, wherein the film is comprised of thermoplastic materials, thermoset materials, or combinations thereof.

43. The packaging container of claim 42, wherein the thermoplastic or thermoset materials are comprised of polyolefin, polyester, polyamide, polyurethane, acrylic, silicone, melamine compounds, polyvinyl acetate, polyvinyl alcohol, nitrile rubber, ionomers, polyvinyl chloride, polyvinylidene chloride, chloroisoprene, or combinations thereof.

* * * * *